(12) United States Patent
Zhang et al.

(10) Patent No.: US 10,164,785 B2
(45) Date of Patent: *Dec. 25, 2018

(54) METHOD FOR IMPLEMENTING A REAL-TIME INDUSTRIAL INTERNET FIELD BROADBAND BUS

(71) Applicant: KYLAND TECHNOLOGY CO.,LTD., Beijing (CN)

(72) Inventors: Jianfeng Zhang, Beijing (CN); Zhiwei Yan, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 172 days.

This patent is subject to a terminal disclaimer.

(21) Appl. No.: 15/263,955

(22) Filed: Sep. 13, 2016

(65) Prior Publication Data

US 2017/0373872 A1  Dec. 28, 2017

(30) Foreign Application Priority Data

Jun. 23, 2016  (CN) .......................... 2016 1 0466726

(51) Int. Cl.
| | |
|---|---|
| *H04L 12/28* | (2006.01) |
| *G06F 13/42* | (2006.01) |
| *H04L 12/40* | (2006.01) |
| *H04L 12/54* | (2013.01) |

(52) U.S. Cl.
CPC ........ *H04L 12/2801* (2013.01); *G06F 13/426* (2013.01); *H04L 12/40* (2013.01); *H04L 12/40013* (2013.01); *H04L 12/40078* (2013.01); *H04L 12/40123* (2013.01); *H04L 12/56* (2013.01); *Y02P 90/02* (2015.11)

(58) Field of Classification Search
None
See application file for complete search history.

(56) References Cited

U.S. PATENT DOCUMENTS

| | | | |
|---|---|---|---|
| 3,856,993 A | 12/1974 | Closs et al. | |
| 5,960,001 A | 9/1999 | Shaffer et al. | |
| 7,339,924 B1* | 3/2008 | Chung ................ | H04L 12/4633 370/356 |
| 7,616,646 B1* | 11/2009 | Ma ...................... | H04L 12/2896 370/392 |

(Continued)

FOREIGN PATENT DOCUMENTS

| | | |
|---|---|---|
| CH | 101778025 B | 8/2012 |
| JP | 2012109831 A | 6/2012 |

*Primary Examiner* — Henry Tsai
*Assistant Examiner* — Aurangzeb Hassan
(74) *Attorney, Agent, or Firm* — Arent Fox LLP

(57) ABSTRACT

The invention discloses a method for implementing a real-time industrial internet field broadband bus, the method including: determining, by a bus controller, the number of bus terminals connected therewith; and allocating, by the bus controller, time slices for the bus terminals according to the number of bus terminals, and transmitting, by the bus controller, the time slices to the bus terminals so that the bus terminals operate in the allocated time slices. Moreover data are transmitted in the bus system by removing Ethernet/IP message header information to thereby reduce the length of the message, and shorten a transmission delay and a bus scan periodicity so as to improve the real-time characteristic of the bus system.

16 Claims, 5 Drawing Sheets

(56) References Cited

U.S. PATENT DOCUMENTS

| | | | |
|---|---|---|---|
| 2002/0010518 A1* | 1/2002 | Reid | G06Q 10/087 |
| | | | 700/31 |
| 2007/0027485 A1* | 2/2007 | Kallmyer | A61N 1/372 |
| | | | 607/2 |
| 2015/0089080 A1* | 3/2015 | Alsup | H04L 49/90 |
| | | | 709/235 |
| 2016/0072929 A1* | 3/2016 | Alsup | H04L 12/40156 |
| | | | 370/392 |

* cited by examiner

| Message header | IP header | TCP header | Data information | FCS |

Fig.4

| Bus device address | Data information | FCS |

Fig.5

METHOD FOR IMPLEMENTING A REAL-TIME INDUSTRIAL INTERNET FIELD BROADBAND BUS

CROSS-REFERENCES TO RELATED APPLICATION

This application claims priority to Chinese patent application No. 201610466726.3, filed on Jun. 23, 2016, which is incorporated herein by reference in their entirety.

FIELD

The present invention relates to the field of information processing, and particularly to a method for implementing a real-time industrial internet field broadband bus.

BACKGROUND

As the Internet technologies are being developed, various buses have been widely applied to industrial field automatization, to monitor by a control end an industrial field in real-time, and there are different data transmission rates required in different application fields, where particularly the performance of servo systems, robots, and other systems requiring high precision may depend directly upon timely transmission of field data and control data, and there remains a bottleneck for the real-time performance of the existing buses.

In the prior art, data are transmitted over the Ethernet in a poorly real-time manner; and data are transmitted over the Ethernet in the mode of Carrier Sense Multiple Access with Collision Detection (CSMA/CD), so if the network is heavily loaded (more than 40%), then the deterministic network may not accommodate the real-time requirement of industrial control. There has been disclosed in the Invention Patent CN101778025B an apparatus and method for transmitting over the Ethernet at a transmission rate of the kilo-mega order, where the apparatus includes at least one single pair of differential line interfaces, and a two-wire Ethernet transfer device including a local transmitter and a local receiver coupled with the single pair of differential line interfaces, where the two-wire Ethernet transfer device communicates data in the mode of CSMA/CD collision detection, thus resulting in poorly real-time transmission in the system.

The operating characteristic and the operating mode of the CAN bus have been introduced in the paper "CAN BUS TECHNOLOGY AND ITS APPLICATION" published in "MANUFACTURING AUTOMATION", where the event trigger mechanism of the CAN bus may cause events in the network to collide easily with each other, so that transmission over a channel may be subjected to an error and a jam, and even if the collision can be resolved by arbitration, then data transmission at a low priority may not be real-time; and if master and slave stations operate, then the respective nodes will communicate freely with each other by occupying a wider channel, thus lowering the transmission rate of the data over the channel, and consequently degrading the transmission performance. If the data are transmitted using the ID of a data packet, then the length of a message thereof will be so long that may result in a transmission delay, and although the data can be transmitted over a distance of up to 10 km, the transmission rate thereof will be significantly lower than the transmission rate over the Ethernet. There may be poorly real-time data transmission in the respective scenarios above.

Transmission of an EtherCAT message in an EtherCAT data frame has been disclosed in the paper "A STUDY ON INDUSTRIAL ETHERNET PROTOCOL BASED ON ETHERCAT" published in "Chinese Selected Master's Dissertation Electronic Journal", where the data frame includes a legacy Ethernet frame, a message header, and other bytes, and there is an MAC address thereof for addressing, but the length of the message may be so long that may hinder the data from being transmitted rapidly, thus resulting in poor real-time transmission thereof.

In summary, the bus in the prior art may be poorly real-time, and a channel may be occupied for transmission, thus blocking the channel.

SUMMARY

Embodiments of the invention provide a method for implementing a real-time industrial internet field broadband bus so as to address the problems in the prior art of the poorly real-time bus, and occupying a channel for transmission, thus blocking the channel.

An embodiment of the invention provides a method for implementing a real-time industrial internet field broadband bus, the method being applicable to a two-wire data transfer network in which a bus controller is connected with one or more bus terminals over the network according to their IP addresses, wherein the method includes:

determining, by the bus controller, the number of bus terminals connected with the bus controller over the two-wire data transfer network;

allocating, by the bus controller, one or more time slices for the one or more bus terminals according to the number of bus terminals; and transmitting, by the bus controller, the time slices to the bus terminals so that the bus terminals operate in the allocated time slices;

wherein the allocated time slices of the different bus terminals do not overlap with each other.

Furthermore determining, by the bus controller, the number of bus terminals connected with the bus controller over the two-wire data transfer network includes:

receiving, by the bus controller, one or more time slice acquisition requests transmitted by the bus terminals; and determining, by the bus controller, the number of bus terminals according to the number of time slice acquisition requests.

Furthermore before determining, by the bus controller, the number of bus terminals connected with the bus controller over the two-wire data transfer network, the method further includes:

determining, by the bus controller, there is a change in the number of bus terminals.

Furthermore allocating, by the bus controller, time slices for the bus terminals according to the number of bus terminals includes:

determining, by the bus controller, for any one bus terminal a transmission priority corresponding to a type identifier of the bus terminal according to a correspondence relationship between the type identifier and the transmission priority; and determining, by the bus controller, the allocated time slices of the bus terminals according to the transmission priorities of the bus terminals, and the number of bus terminals.

Furthermore the method further includes:

upon reception of a data packet to be transmitted to a bus terminal, if it is determined that the data packet is not a configuration data packet, then determining, by the bus controller, a bus device address corresponding to a destination IP address and a destination MAC address according to a binding relationship between the destination IP address, the destination MAC address, and the bus device address; and composing, by the bus controller, a new message from the bus device address, and data information in the data packet, and transmitting the new message to the bus terminal corresponding to the determined bus device address.

Furthermore composing, by the bus controller, the new message from the bus device address, and the data information in the data packet includes:

removing, by the bus controller, a header in the data packet, and reserving the data information in the data packet; and generating the new message by adding the determined bus device address before the data information in the data packet as a header.

Furthermore the method further includes:

upon reception of the data packet to be transmitted to the bus terminal, it is determined that the data packet is a configuration data packet, then determining, by the bus controller, the corresponding bus terminal according to the configuration data packet; and transmitting, by the bus controller, the configuration data packet to the bus terminal so that the bus terminal performs corresponding configuration operations according to the configuration data packet.

Furthermore generating, by the bus controller, the binding relationship between the destination IP address, the destination MAC address, and the bus device address includes:

allocating, by the bus controller, an IP address and a bus device address for the bus terminal upon reception of an IP address acquisition request transmitted by the bus terminal; and generating, by the bus controller, a three-dimension correspondence relationship between an MAC address of the bus terminal, and the allocated IP address and bus device address of the bus terminal;

wherein the IP address acquisition request includes the MAC address of the bus terminal.

Furthermore a precision clock synchronization protocol is the IEEE1588 clock protocol.

Furthermore the method further includes:

allocating, by the bus controller, a time slice for the bus controller according to the number of bus terminals.

An advantageous effect of the invention lies in that the number of devices over the bus is determined, and the respective devices over the bus are allocated their time slices, so that the respective bus devices can operate in their respective time slices, and the time slices of the different bus devices will not overlap with each other, that is, in the embodiments of the invention, there will be at most one device operating on data over the bus in the respective time slides, thus avoiding the data transmitted over the bus from colliding with each other, and thus being blocked so as to guarantee real-time data transmission.

BRIEF DESCRIPTION OF THE DRAWINGS

In order to make the technical solutions according to the embodiments of the invention art more apparent, the drawings to which a description of the embodiments refers will be briefly introduced below, and apparently the drawings to be described below are merely illustrative of some of the embodiments of the invention, and those ordinarily skilled in the art can derive from these drawings other drawings without any inventive effort. In the drawings:

FIG. 4 is a schematic diagram of a data message according to an embodiment of the invention;

FIG. 5 is a schematic diagram of a new data message according to an embodiment of the invention;

DETAILED DESCRIPTION

The invention provides a method for implementing industrial internet field broadband bus, the method being applicable to a two-wire data transfer network. In embodiments of the invention, the number of devices over the bus is determined, and the respective devices over the bus are allocated with their time slices, so that the respective bus devices can operate in their own time slices, and the time slices of the different bus devices will not overlap with each other, that is, in the embodiments of the invention, there will be at most one device performing data process over the bus in one time slide, thus avoiding the data transmitted over the bus from colliding with each other, and thus being blocked so as to guarantee real-time data transmission.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

Figure 1A:
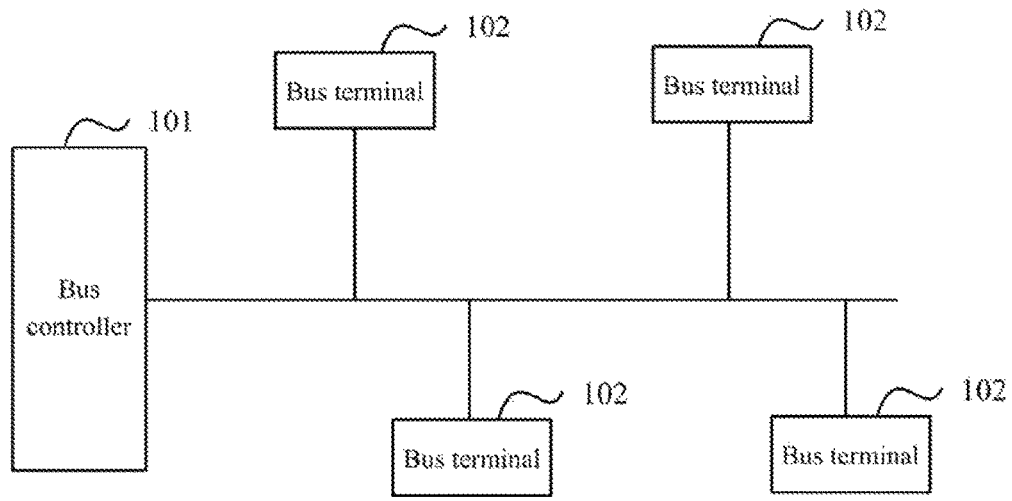
FIG. 1A is a first schematic architectural diagram of a two-wire data transfer network according to an embodiment of the invention.

As illustrated in FIG. 1A which is a first schematic architectural diagram of a two-wire data transfer network according to an embodiment of the invention, the two-wire data transfer network includes a bus controller 101 and at least one bus terminal 102, where the bus controller 101 and one or more bus terminals 102 are connected over the two-wire data transfer network.

Figure 1B:
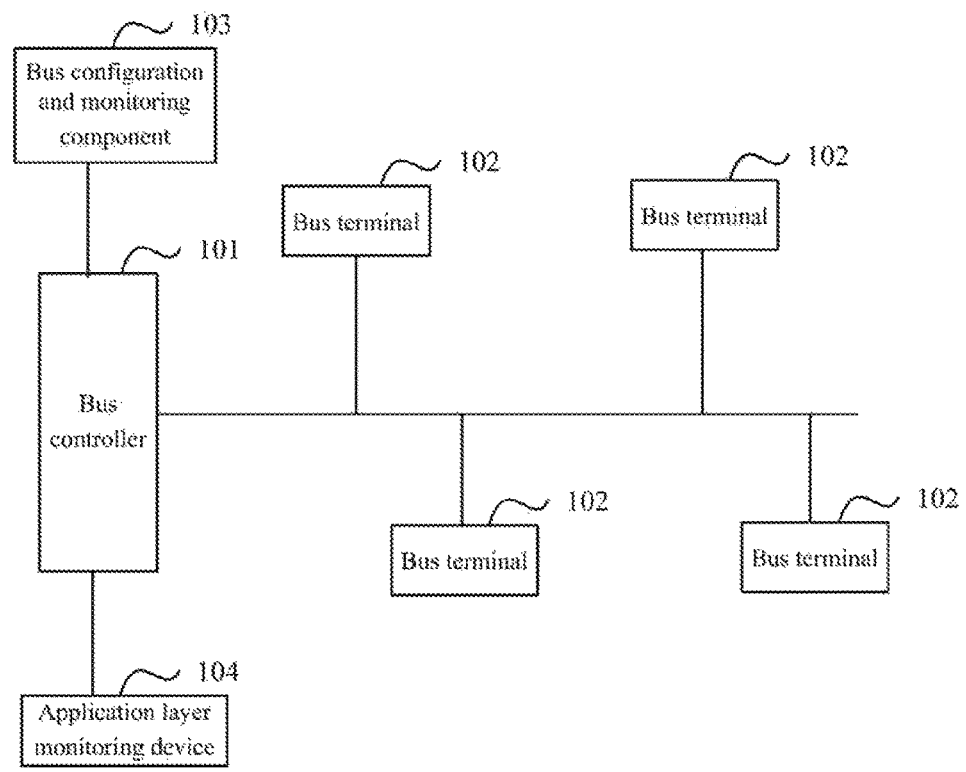
FIG. 1B is a second schematic architectural diagram of a two-wire data transfer network according to an embodiment of the invention.

As illustrated in FIG. 1B which is a second schematic architectural diagram of a two-wire data transfer network according to an embodiment of the invention, the two-wire data transfer network further includes a bus configuration and monitoring component 103, connected with the bus controller 101, configured to transmit configuration information or a monitoring instruction for at least one device over the two-wire data transfer network to the bus controller 101 so that the bus controller 101 transmits the configuration information to the corresponding device; and to receive operating state information, transmitted by the bus controller 101, generated by at least one device over the two-wire data transfer network. The two-wire data transfer network further includes an application monitoring device 104, connected with the bus controller 101, configured to acquire data of the bus controller 101 and one or more bus terminals 102, and to control the bus controller 101 and one or more bus terminals 102 in real-time.

Figure 2:
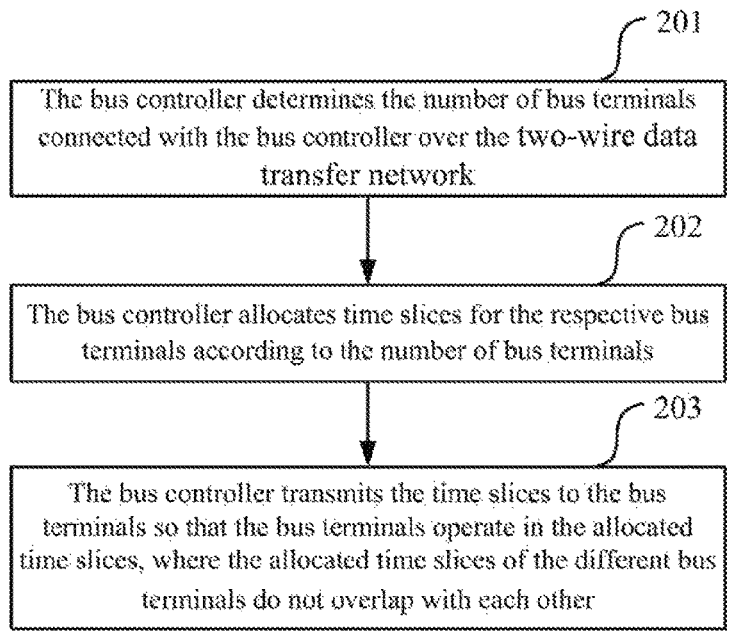
FIG. 2 is a flow chart of a method for implementing a real-time industrial internet field broadband bus according to an embodiment of the invention.

FIG. 2 illustrates a method for implementing a real-time industrial internet field broadband bus according to an embodiment of the invention, where the method includes:

Step 201, the bus controller determines the number of the bus terminals connected with the bus controller over the two-wire data transfer network;

Step 202, the bus controller allocates time slices for the bus terminals according to the number of bus terminals; and Step 203, the bus controller transmits the time slices to the bus terminals so that the bus terminals operate in the allocated time slices;

The allocated time slices of the different bus terminals do not overlap with each other.

In the step 201, the bus controller determines the number of devices over the two-wire data transfer network, where the devices include the bus terminal and the bus controller, then the number of devices over the two-wire data transfer network can be determined as the determined number of bus terminals plus one bus controller.

In an embodiment of the invention, upon reception of the time slice acquisition requests transmitted by the bus terminals, the bus controller determines the number of bus terminals according to the number of time slice acquisition requests.

In the embodiment above of the invention, as illustrated in FIGS. 1A and 1B, for example, if there are four bus terminals and one bus controller in the two-wire data transfer network, then all of the four bus terminals may transmit time slice acquisition requests to the bus controller, so the bus controller can determine that there are four bus terminals in the two-wire data transfer network according to the number of time slice acquisition requests transmitted by the bus terminals, and the bus controller can further determine that there are five devices in the two-wire data transfer network.

Optionally in an embodiment of the invention, when the two-wire data transfer network is deployed, the bus controller has allocated the time slices for the bus terminals over the two-wire data transfer network, and if there is a new bus terminal connected with the bus controller over the two-wire data transfer network, then the bus controller will re-determine the number of devices over the two-wire data transfer network.

In the step 202, the bus controller allocates the time slices for the respective bus terminals over the two-wire data transfer network according to the number of bus terminals upon determining the number of bus terminals.

As illustrated in FIGS. 1A and 1B, there are four bus terminals over the two-wire data transfer network, then the bus controller allocates time slices for the four bus terminals so that the allocated time slices of the four bus terminals do not overlap with each other.

For example, in an embodiment of the invention, the bus controller allocates a pulse time of, for example, 0.1 s for four bus terminals including a bus terminal A, a bus terminal B, a bus terminal C, and a bus terminal D, and optionally in an embodiment of the invention, the bus controller can equally allocate time slices to the four bus terminals, that is, each bus terminal is allocated a time slice of 0.025 s, as depicted in Table 1 below:

TABLE 1

A table of time slices allocated by the bus controller for bus terminals

| Bus terminals | Time slices/s |
|---|---|
| Bus terminal A | [0, 0.025] |
| Bus terminal B | (0.025, 0.05] |
| Bus terminal C | (0.05, 0.075] |
| Bus terminal D | (0.075, 0.1] |

In the embodiment above, [ ] represents being more than or equal to the smallest value in a set, and less than or equal to the largest value in the set, and (] represents being more than the smallest value in the set, and less than or equal to the largest value in the set.

In the embodiment above, the bus terminal can operate in the time slice of [0,0.025], and when the bus terminal A is operating in the time slice of [0,0.025], that is, the bus terminal A is processing data, then there is no other bus terminal operating over the two-wire data transfer network to thereby avoid in effect a channel from being occupied so as to improve the efficiency of transmission. Of course, in the embodiment above, the bus controller allocates randomly the time slices for the four bus terminals, and in the embodiment above, the time slices of the four bus terminals may vary, although a repeated description thereof will be omitted here.

Optionally in an embodiment of the invention, the bus controller determines for any one bus terminal a transmission priority corresponding to a type identifier of the bus terminal according to a correspondence relationship between the type identifier and the transmission priority; and the bus controller determines the allocated time slices of the bus terminals according to the transmission priorities of the bus terminals, and the number of bus terminals.

In the embodiment above of the invention, since the respective bus terminals process a data message differently in operation, the respective terminals can be assigned with different priorities. In an embodiment of the invention, the type identifiers of the bus terminals can be word codes or sequences charactering the types of the bus terminals, for example, in an embodiment of the invention, the type identifier of the bus terminal A is 1-1, which represents that the type thereof is a pressure sensor 1, etc., as depicted in Table 2:

TABLE 2

Table of type identifiers of bus terminals

| Bus terminals | Type identifiers | Remarks |
|---|---|---|
| Bus terminal A | 1-1 | Pressure sensor 1 |
| Bus terminal B | 1-2 | Pressure sensor 2 |
| Bus terminal C | 2-1 | Temperature sensor 1 |
| Bus terminal D | 2-2 | Temperature sensor 1 |

In an embodiment of the invention, the priorities of the bus terminals are determined according to the type identifiers of the bus terminals, where in the embodiment of the invention, the priorities of the bus terminals can be determined according to a correspondence relationship table between a type identifier and a priority of a bus terminal in Table 3:

TABLE 3

Correspondence relationship table between a type identifier and a priority of a bus terminal

| Bus terminal type identifiers | Priorities |
|---|---|
| 1-1 | 1 |
| 1-2 | 2 |
| 2-1 | 3 |
| 2-2 | 4 |

In an embodiment of the invention, the larger the number of the priority above, the lower the priority, that is, the priority 1 is higher than the priority 4. In an embodiment of the invention, the time slices are allocated for the bus terminals according to the number of bus terminals over the two-wire data transfer network, and the priorities of the bus terminals.

In an embodiment of the invention, for example, the bus controller allocates the time slices according to the priorities of the respective bus terminals in such a process that the bus controller firstly determines from a pulse time of, for example, 0.1 s the respective time slices to be allocated for the four bus terminals, according to the priorities of the bus terminals so that the time slice of the bus terminal A is 0.04 s, the time slice of the bus terminal B is 0.03 s, the time slice of the bus terminal C is 0.02 s, and the time slice of the bus terminal D is 0.05 s.

Of course, the bus controller can determine the allocated time slices of the bus terminals according to the number of bus terminals, and the priorities of the bus terminals as described in the embodiments above merely by way of an example, but the allocated time slices of the bus terminals can be otherwise determined according to the number of bus terminals, and the priorities of the bus terminals without departing from the claimed scope of the embodiments of the invention, although a repeated description thereof will be omitted here.

Optionally in an embodiment of the invention, upon determining the number of bus terminals in the two-wire data transfer network, the bus controller can allocate the time slices for the bus terminals according to the number of bus terminals in the two-wire data transfer network to thereby better avoid data transmission from colliding with each other or being blocked.

Figure 3:
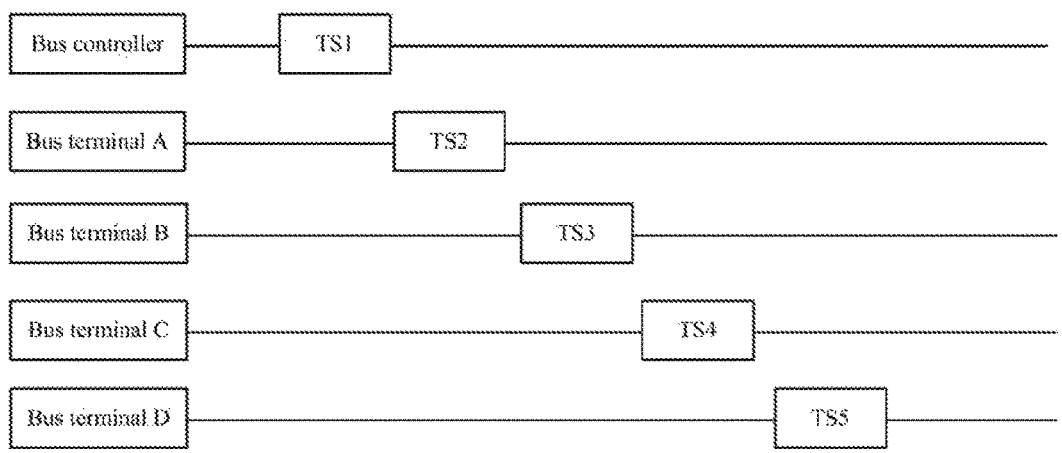
FIG. 3 is a schematic diagram of devices in a two-wire data transfer network according to an embodiment of the invention.

For example, in an embodiment of the invention, when the bus controller determines that there are four bus terminals, then the total number of devices is five, so the bus controller equally divides a pulse time of, for example, 0.1 s, into five time slices, and allocates them randomly for the four bus terminals and the bus controller, so that the bus controller and the bus terminals can operate in their own allocated time slices. As illustrated in FIG. 3, TS1 represents the allocated time slice of the bus controller, TS2 represents the allocated time slice of the bus terminal A, TS3 represents the allocated time slice of the bus terminal B, TS4 represents the allocated time slice of the bus terminal C, and TS5 represents the allocated time slice of the bus terminal D, where TS1, TS2, TS3, TS4, and TS4 do not overlap with each other.

In an embodiment of the invention, the bus controller can further determine periodically the number of devices in the two-wire data transfer network so that if a new device joins the two-wire data transmission network, then the bus controller will reallocate time slices. In an embodiment of the invention, the bus controller determines whether there is an increase in the number of bus terminals, upon arrival of a periodicity, and if not, then the bus controller will wait for a next periodicity to further determine the number of bus terminals.

When the bus controller determines there is a change in the number of bus terminals, then the bus controller reallocates time slices for the bus terminals according to the number of bus terminals, and transmits the allocated time slices to the bus terminals.

In an embodiment of the invention, upon reception of a data packet to be transmitted to a bus terminal, the bus controller further determines whether the data packet is a configuration data packet. In an embodiment of the invention, the configuration data packet is configured for debugging, configuration, or maintenance between the bus controller and the bus terminal. When the bus controller determines that the received data packet to be transmitted to the bus terminal is not a configuration data packet, then the bus controller determines a destination IP address and a destination MAC address in the data packet, and determine a bus device address corresponding to the destination IP address and the destination MAC address of the data packet according to a binding relationship between a destination IP address, a destination MAC address, and a bus device address.

In an embodiment of the invention, the bus controller generates the binding relationship between a destination IP address, a destination MAC address, and a bus device address as follows:

The bus controller allocates an IP address and a bus device address for the bus terminal upon reception of an IP address acquisition request transmitted by the bus terminal; and The bus controller generates a three-dimension correspondence relationship between an MAC address of the bus terminal, and the allocated IP address of the bus terminal and bus device address of the bus terminal;

The IP address acquisition request includes the MAC address of the bus terminal.

In the embodiment above of the invention, the bus controller allocates the IP address and the bus device address for the bus terminal upon reception of the IP address acquisition request transmitted by the bus terminal, for example, when the bus terminal A transmits an IP address acquisition request to the bus controller, where the IP address acquisition request includes the MAC address 00-01-6C-06-A6-29 of the bus terminal A, then the bus controller allocates the IP address of 111.112.0.1 for the bus terminal A, and allocates the bus device address of 0x34 for the bus terminal A. Also the bus controller stores the three items in a correspondence relationship table between the three items, and after the bus controller learns the IP addresses and the MAC addresses of all the bus terminals over the two-wire data transfer network, the bus controller stores the correspondence relationship table between the three items as depicted in Table 4:

TABLE 4

Three-dimension correspondence table between a bus device address, an MAC address, and an IP address

| Bus device addresses | MAC addresses | IP addresses |
|---|---|---|
| 0x34 | 00-01-6C-06-A6-29 | 111.112.0.1 |
| 0x35 | 01-00-23-5A-46-09 | 111.112.0.2 |
| 0x36 | 12-34-56-AB-CD-EF | 111.112.0.3 |
| 0x37 | 13-25-78-EE-FF-DD | 111.112.0.4 |

In an embodiment of the invention, upon reception of the data packet, the bus controller determines that the data packet is not a configuration data packet, then the bus controller obtains the destination IP address and the destination MAC address in the data packet, for example, the bus controller obtains the destination IP address of 00-01-6C-06-A6-29, and the destination MAC address of 111.112.0.1, so the bus controller can search Table 4 for the bus device address corresponding to the IP address and the MAC address, and retrieve the bus device address of 0x34.

In an embodiment of the invention, FIG. 4 illustrates a message format of the data packet received by the bus controller, which includes several components which are a message header, an IP header, a TCP header, a data information segment, and a Frame Check Sequence (FCS).

After the bus device address corresponding to the IP address and the MAC address is determined, the bus controller removes the message header, the IP header, and the TCP header, and determines the bus device address corresponding to the IP address and the MAC address as a header, as illustrated in FIG. 5.

In the embodiment above of the invention, the bus controller can replace the message header, the IP header, and the TCP header with the bus device address to thereby reduce in effect the length of the message transmitted over the two-wire data transfer network so as to improve the efficiency of transmitting the data packet.

In an embodiment of the invention, in order to allocate more accurately the time slices for the bus controller and the bus terminals over the two-wire data transfer network so that the allocated time slices do not overlap with each other, the bus controller can synchronizes its clock with the respective bus terminals through the precision clock synchronization protocol before the time slices are allocated.

In an embodiment of the invention, the bus controller can synchronize clock with the respective bus terminals in a number of protocols including the Precision Time Protocol (PTP), the Network Time Protocol (NTP), the Simple Network Time Protocol (SNTP), or any one of other applicable protocols. In an embodiment of the invention, firstly the bus controller synchronizes its time in any one of the clock synchronization protocol above, and then the bus controller synchronizes its time respectively with the other bus terminals, thus creating a reference clock for the two-wire data transfer network.

In order to ensure the time synchronization on all the devices in the two-wire data transfer network, in an embodiment of the invention, a synchronization time interval can be further preset, and when the synchronization time interval arrives, then the bus controller may synchronize time with the other bus terminals.

Optionally in an embodiment of the invention, the precision clock synchronization protocol is the IEEE1588 clock protocol.

In order to describe the embodiments of the invention in further details, an example thereof will be described here.

Figure 6:
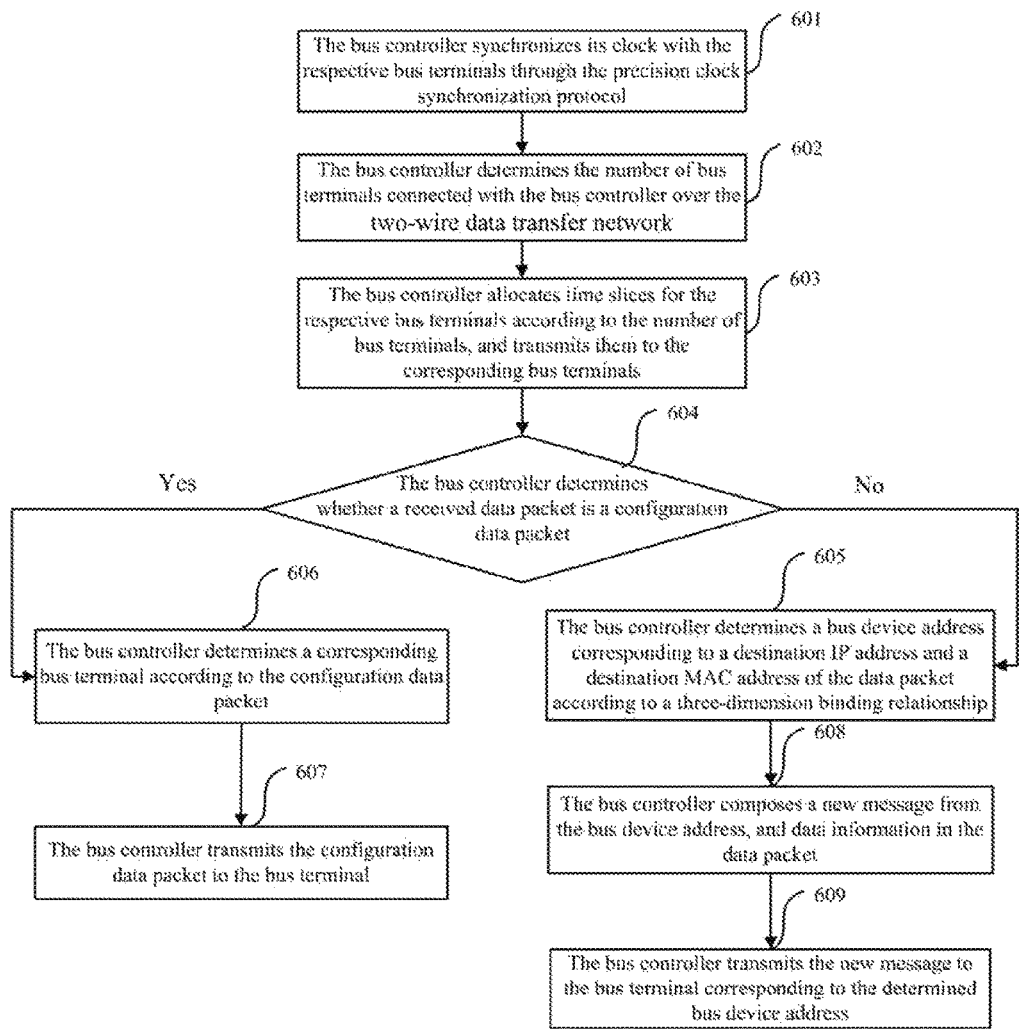
FIG. 6 is a flow chart of another method for implementing a real-time industrial internet field broadband bus according to an embodiment of the invention.

As illustrated in FIG. 6, a method for implementing a real-time industrial internet field broadband bus according to an embodiment of the invention includes the following steps:

Step 601, the bus controller synchronizes its clock with the respective bus terminals through the precision clock synchronization protocol.

Step 602, the bus controller determines the number of bus terminals connected with the bus controller over the two-wire data transfer network;

Step 603, the bus controller allocates time slices for the respective bus terminals according to the number of bus terminals, and transmits them to the corresponding bus terminals;

Step 604, the bus controller determines whether a received data packet is a configuration data packet, and if the received data packet is not the configuration data packet, then the flow will proceed to the step 605; otherwise, the flow will proceed to the step 606;

Step 605, the bus controller determines a bus device address corresponding to a destination IP address and a destination MAC address of the data packet according to a binding relationship between a destination IP address, a destination MAC address, and a bus device address, and the flow proceeds to the step 608;

Step 606, the bus controller determines a corresponding bus terminal according to the configuration data packet;

Step 607, the bus controller transmits the configuration data packet to the bus terminal;

Step 608, the bus controller composes a new message from the bus device address, and data information in the data packet;

Step 609, the bus controller transmits the new message to the bus terminal corresponding to the determined bus device address.

In the embodiment above of the invention, the performance order of the step 601, the step 602, and the steps 603 to 609 may not be limited.

Figure 7:
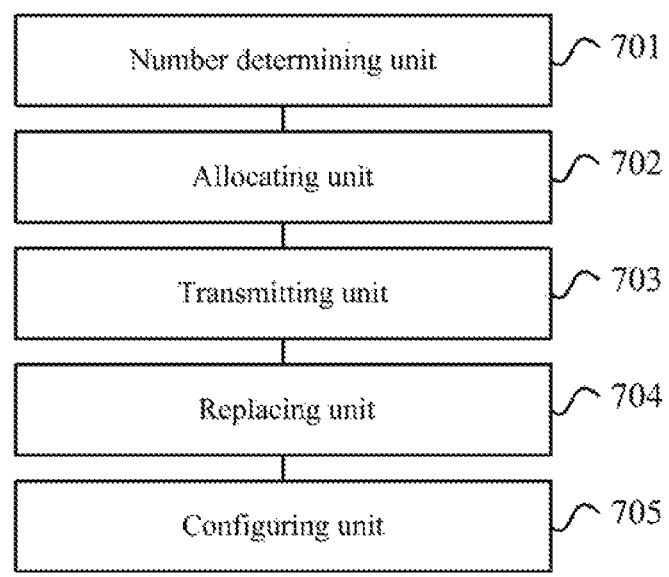
FIG. 7 is a schematic structural diagram of an apparatus for implementing a real-time industrial internet field broadband bus according to an embodiment of the invention.

Based upon the same technical idea, as illustrated in FIG. 7, an embodiment of the invention further provides an apparatus for implementing a real-time industrial internet field broadband bus, the apparatus being applicable to a two-wire data transfer network, where the apparatus includes:

A number determining unit 701 is configured to determine the number of bus terminals connected with the bus controller over the two-wire data transfer network;

An allocating unit 702 is configured to allocate time slices for the respective bus terminals according to the number of bus terminals; and A transmitting unit 703 is configured to transmit the time slices to the bus terminals so that the bus terminals operate in the allocated time slices;

The allocated time slices of the different bus terminals do not overlap with each other.

Furthermore the number determining unit 701 is configured:

To receive time slice acquisition requests transmitted by the bus terminals; and To determine the number of bus terminals according to the number of time slice acquisition requests.

Furthermore the number determining unit 701 is configured:

To determine there is a change in the number of bus terminals.

Furthermore the allocating unit 702 is configured:

To determine for any one bus terminal a transmission priority corresponding to a type identifier of the bus terminal according to a correspondence relationship between the type identifier and the transmission priority; and To determine the allocated time slices of the bus terminals according to the transmission priorities of the bus terminals, and the number of bus terminals.

Furthermore the apparatus further includes:

A replacing unit 704 is configured, upon reception of a data packet to be transmitted to a bus terminal, if it is determined that the data packet is not a configuration data packet, to determine a bus device address corresponding to a destination IP address and a destination MAC address according to a binding relationship between a destination IP address, a destination MAC address, and a bus device address; and To compose a new message from the bus device address, and data information in the data packet, and to transmit the new message to the bus terminal corresponding to the determined bus device address.

Furthermore the replacing unit is configured:

To remove a header in the data packet, and to reserve the data information in the data packet; and To generate the new message by adding the determined bus device address before the data information in the data packet as a header.

Furthermore the apparatus further includes:

A configuring unit 705 is configured, upon reception of the data packet to be transmitted to the bus terminal, it is determined that the data packet is a configuration data packet, to determine the corresponding bus terminal according to the configuration data packet; and To transmit the configuration data packet to the bus terminal so that the bus terminal performs corresponding configuration operations according to the configuration data packet.

Furthermore the binding relationship between a destination IP address, a destination MAC address, and a bus device address is generated as follows:

The bus controller allocates an IP address and a bus device address for the bus terminal upon reception of an IP address acquisition request transmitted by the bus terminal; and The bus controller generates a three-dimension correspondence relationship between an MAC address of the bus terminal, and the allocated IP address and bus device address of the bus terminal;

The IP address acquisition request includes the MAC address of the bus terminal.

Furthermore the precision clock synchronization protocol is the IEEE1588 clock protocol.

Furthermore the allocating unit 702 is further configured:

To allocate a time slice for the bus controller according to the number of bus terminals.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for implementing a real-time industrial internet field broadband bus, the method being applicable to a two-wire data transfer network in which a bus controller is connected with one or more bus terminals over the network according to their IP addresses, and in which the bus controller synchronizes its clock with the bus terminals, wherein the method comprises:

determining, by the bus controller, the number of bus terminals connected with the bus controller over the two-wire data transfer network;

allocating, by the bus controller, one or more time slices for the one or more bus terminals according to the number of bus terminals; and transmitting, by the bus controller, the time slices to the bus terminals so that the bus terminals operate in the allocated time slices;

wherein the allocated time slices of the different bus terminals do not overlap with each other;

wherein the method further comprises:

upon reception of a data packet to be transmitted to a bus terminal, if it is determined that the data packet is not a configuration data packet, then determining, by the bus controller, a bus device address corresponding to a destination IP address and a destination MAC address according to a binding relationship between the destination IP address, the destination MAC address, and the bus device address; and composing, by the bus controller, a new message from the bus device address, and data information in the data packet, and transmitting the new message to the bus terminal corresponding to the determined bus device address;

wherein composing, by the bus controller, the new message from the bus device address, and the data information in the data packet comprises:

removing, by the bus controller, a header in the data packet, and reserving the data information in the data packet; and generating the new message by adding the determined bus device address before the data information in the data packet as a header.

2. The method according to claim 1, wherein determining, by the bus controller, the number of bus terminals connected with the bus controller over the two-wire data transfer network comprises:
   receiving, by the bus controller, one or more time slice acquisition requests transmitted by the one or more bus terminals; and
   determining, by the bus controller, the number of bus terminals according to the number of time slice acquisition requests.

3. The method according to claim 1, wherein before determining, by the bus controller, the number of bus terminals connected with the bus controller over the two-wire data transfer network, the method further comprises:
   determining, by the bus controller, there is a change in the number of bus terminals.

4. The method according to claim 1, wherein allocating, by the bus controller, time slices for the bus terminals according to the number of bus terminals comprises:
   determining, by the bus controller, for any one bus terminal a transmission priority corresponding to a type identifier of the bus terminal according to a correspondence relationship between the type identifier and the transmission priority; and
   determining, by the bus controller, the allocated time slices of the bus terminals according to the transmission priorities of the bus terminals, and the number of bus terminals.

5. The method according to claim 1, wherein the method further comprises:
   upon reception of the data packet to be transmitted to the bus terminal, it is determined that the data packet is a configuration data packet, then determining, by the bus controller, the corresponding bus terminal according to the configuration data packet; and
   transmitting, by the bus controller, the configuration data packet to the bus terminal so that the bus terminal performs a corresponding configuration operation according to the configuration data packet.

6. The method according to claim 1, wherein generating, by the bus controller, the binding relationship between the destination IP address, the destination MAC address, and the bus device address comprises:
   allocating, by the bus controller, the IP address and the bus device address for the bus terminal upon reception of the IP address acquisition request transmitted by the bus terminal; and
   generating, by the bus controller, a three-dimension correspondence relationship between the MAC address of the bus terminal, and the allocated IP address and bus device address of the bus terminal;
   wherein the IP address acquisition request includes the MAC address of the bus terminal.

7. The method according to claim 1, wherein a precision clock synchronization protocol is the IEEE1588 clock protocol.

8. The method according to claim 1, wherein the method further comprises:
   allocating, by the bus controller, a time slice for the bus controller according to the number of bus terminals.

9. The method according to claim 2, wherein the method further comprises:
   allocating, by the bus controller, a time slice for the bus controller according to the number of bus terminals.

10. The method according to claim 3, wherein the method further comprises:
    allocating, by the bus controller, a time slice for the bus controller according to the number of bus terminals.

11. The method according to claim 4, wherein the method further comprises:
    allocating, by the bus controller, a time slice for the bus controller according to the number of bus terminals.

12. The method according to claim 1, wherein the method further comprises:
    allocating, by the bus controller, a time slice for the bus controller according to the number of bus terminals.

13. The method according to claim 1, wherein the method further comprises:
    allocating, by the bus controller, a time slice for the bus controller according to the number of bus terminals.

14. The method according to claim 5, wherein the method further comprises:
    allocating, by the bus controller, a time slice for the bus controller according to the number of bus terminals.

15. The method according to claim 6, wherein the method further comprises:
    allocating, by the bus controller, a time slice for the bus controller according to the number of bus terminals.

16. The method according to claim 7, wherein the method further comprises:
    allocating, by the bus controller, a time slice for the bus controller according to the number of bus terminals.

* * * * *